United States Patent
Neudecker

(10) Patent No.: US 10,415,297 B2
(45) Date of Patent: Sep. 17, 2019

(54) ASSISTANCE DEVICE FOR LOADING A MOTOR VEHICLE

(71) Applicant: Audi AG, Ingolstadt (DE)

(72) Inventor: Ansgar Neudecker, Greding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/773,870

(22) PCT Filed: Aug. 25, 2016

(86) PCT No.: PCT/EP2016/001432
§ 371 (c)(1),
(2) Date: May 4, 2018

(87) PCT Pub. No.: WO2017/076480
PCT Pub. Date: May 11, 2017

(65) Prior Publication Data
US 2019/0071917 A1    Mar. 7, 2019

(30) Foreign Application Priority Data

Nov. 4, 2015   (DE) .......................... 10 2015 014 211

(51) Int. Cl.
*G06K 9/00*   (2006.01)
*E05F 15/76*   (2015.01)
(Continued)

(52) U.S. Cl.
CPC .............. *E05F 15/76* (2015.01); *B60R 25/24* (2013.01); *E05F 2015/767* (2015.01);
(Continued)

(58) Field of Classification Search
None
See application file for complete search history.

(56) References Cited

U.S. PATENT DOCUMENTS

| 7,579,791 B2 | 8/2009 | Nakashima et al. |
| 8,630,769 B2 | 1/2014 | Wittorf |
(Continued)

FOREIGN PATENT DOCUMENTS

| CN | 101097655 A | 1/2008 |
| CN | 102442263 A | 5/2012 |
(Continued)

OTHER PUBLICATIONS

English-language abstract of German Patent Application Publication No. 10 2013 004 537 A1, published Sep. 19, 2013; 1 page.
(Continued)

*Primary Examiner* — Stephen P Coleman
(74) *Attorney, Agent, or Firm* — Sterne, Kessler, Goldstein & Fox P.L.L.C.

(57) ABSTRACT

The disclosure relates to an assistance device for loading a motor vehicle, having at least one detection device by means of which an item that is to be loaded into the motor vehicle is detectable, and having a door opening device by means of which at least one access opening to a cargo area of the motor vehicle is releasable in accordance with this detection of the item. The disclosure further relates to a method for operating an assistance device.

12 Claims, 1 Drawing Sheet

(51) Int. Cl.
*B60R 25/24* (2013.01)
*E05F 15/73* (2015.01)

(52) U.S. Cl.
CPC ... *E05Y 2900/531* (2013.01); *E05Y 2900/546* (2013.01); *E05Y 2900/548* (2013.01)

(56) References Cited

U.S. PATENT DOCUMENTS

| | | | |
|---|---|---|---|
| 9,205,806 B2 | 12/2015 | Günter | |
| 2015/0009062 A1* | 1/2015 | Herthan | E05B 83/16 342/70 |
| 2015/0284984 A1 | 10/2015 | Kanter et al. | |
| 2016/0012654 A1* | 1/2016 | Sherony | G07C 9/00087 340/5.61 |

FOREIGN PATENT DOCUMENTS

| | | |
|---|---|---|
| CN | 203294998 U | 11/2013 |
| DE | 102011111600 A1 | 2/2013 |
| DE | 102013004537 A1 | 9/2013 |
| DE | 102014010471 A1 | 12/2014 |
| DE | 102014018198 A1 | 6/2015 |
| JP | 2005-315024 A | 11/2005 |
| JP | 2005315024 A | 11/2005 |
| WO | WO 2013134865 A1 | 9/2013 |
| WO | WO 2014086763 A1 | 6/2014 |

OTHER PUBLICATIONS

English-language abstract of German Patent Application Publication No. 10 2014 010 471 A1, published Dec. 18, 2014; 6 pages.
English-language abstract of German Patent Application Publication No. 10 2014 018 198 A1, published Jun. 18, 2015; 6 pages.
English-language abstract of Japanese Patent Application Publication No. 2005-315024 A, published Nov. 10, 2005; 1 page.
International Search Report and Written Notice of the International Searching Authority directed to related International Patent Application No. PCT/EP2016/001432, dated Nov. 15, 2016, with attached English-language translation; 13 pages.
International Preliminary Report on Patentability directed to related International Patent Application No. PCT/EP2016/001432, dated May 17, 2017, with attached English-language translation; 10 pages.

* cited by examiner

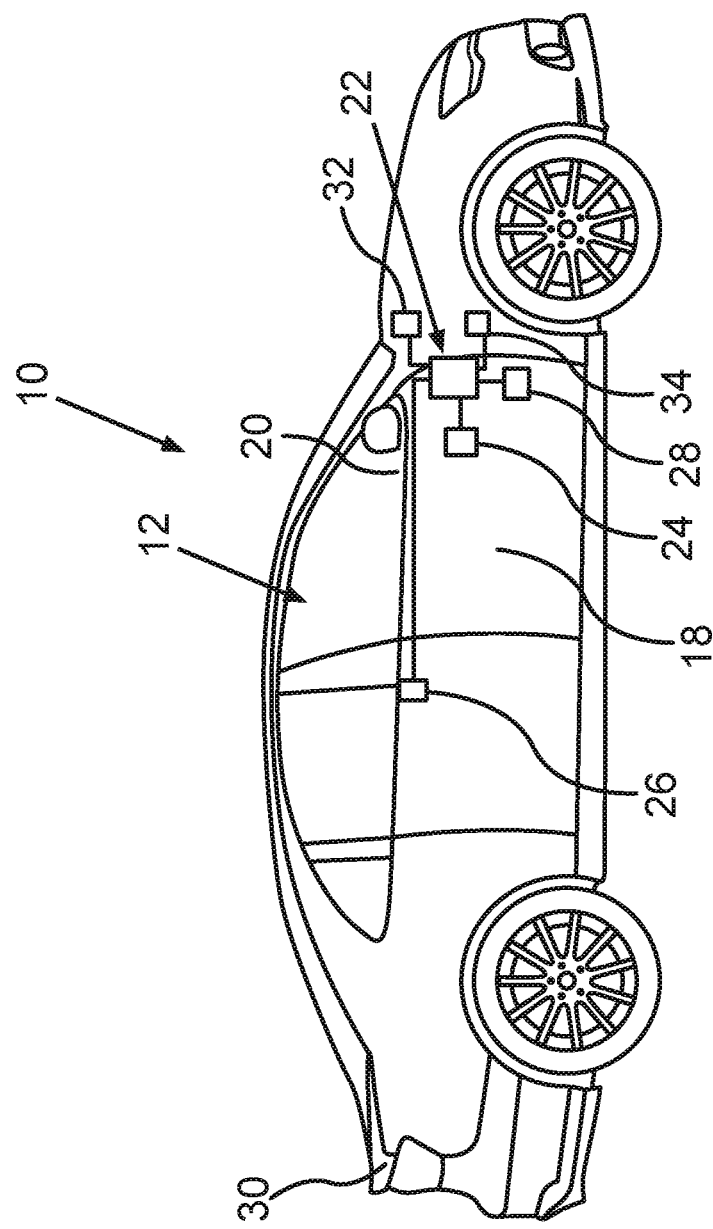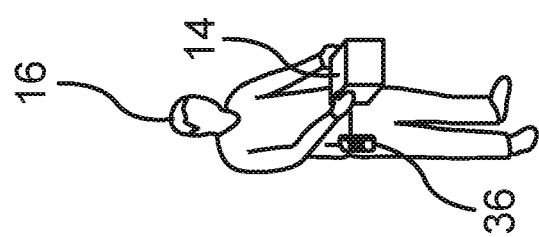

ASSISTANCE DEVICE FOR LOADING A MOTOR VEHICLE

TECHNICAL FIELD

This disclosure relates to an assistance device for loading a motor vehicle. This disclosure further relates to a method for operating an assistance device for loading a motor vehicle.

BACKGROUND

A method for assistance during loading of a vehicle is known from DE 10 2014 018 198 A1. The dimensions of an item to be loaded prior to the loading are detected, and in accordance with these dimensions and vehicle-typical data, information concerning the stowability of the item for a plurality of various predefined vehicle types is output to a user.

A cargo area cover arrangement for closing a cargo area of a motor vehicle with a cargo area cover is known from DE 10 2014 010 471 A1. It is provided that opening and closing of this cargo area cover is coupled to an actuation of the tailgate of the motor vehicle.

A device for load monitoring in a vehicle is known from DE 10 2013 004 537 A1. This device includes a detection unit for detecting a size and/or a weight of an item. An output unit, which is provided for outputting a weight- and size-dependent optimal position of the item within a cargo area of the vehicle is coupled to the detection unit.

BRIEF DESCRIPTION OF THE DRAWINGS/FIGURES

The accompanying drawing is incorporated herein and forms a part of the specification.

FIG. 1 shows a schematic side view of a motor vehicle, having a cargo area into which an item is to be loaded, according to some embodiments.

In the FIGURE, functionally identical elements are indicated with the same reference numerals.

DETAILED DESCRIPTION

The object of this disclosure is to provide an assistance device for loading a motor vehicle and a method for operating an assistance device for loading a motor vehicle, which particularly simplify the loading of a motor vehicle with an item.

These objects are achieved, according to the embodiments, by an assistance device and a method as disclosed herein and in the independent claims. Advantageous embodiments together with practical refinements are set forth in the respective subclaims; advantageous embodiments of the assistance device are to be regarded as advantageous embodiments of the method, and vice versa.

A first aspect of this disclosure relates to an assistance device for loading a motor vehicle. According to some embodiments, this assistance device includes at least one detection device by means of which an item that is to be loaded into the motor vehicle can be detected, and a door opening device by means of which at least one access opening to a cargo area in the motor vehicle is releasable in accordance with a detection of the item. The access opening may be, for example, an opening of the motor vehicle that is releasable and closable by means of a side door, a trunk lid, and/or a tailgate. However, the access opening may also be an opening that is releasable and closable by means of a sliding roof, a roof cover of a motor vehicle designed as a convertible, and/or particular windows of the motor vehicle. The door opening device may then adjust, for example, the side door, the trunk lid, the tailgate, the roof cover of the convertible, the sliding roof, and/or the windows from a closed position into an open position by means of an electric, pneumatic, and/or hydraulic drive. Access to the cargo area of the motor vehicle may thus be automatically enabled when an item to be loaded is detected.

The assistance device may thus automatically make the cargo area accessible if it has been determined that an item is to be loaded into the cargo area. The loading of the motor vehicle is particularly simplified in this way. It is no longer necessary for a person who would like to load the item into the motor vehicle to release the access opening him/herself. Thus, for example, it is no longer necessary to set the item down in order to be able to actuate a door opener for the loading.

In addition, the loading may be particularly simplified for particularly bulky and/or heavy items. For example, sensors below a rear bumper of a motor vehicle are known that are able to cause a tailgate or a trunk lid to open by moving a foot into a certain area behind and/or beneath the motor vehicle. For bulky items, however, such a movement and/or placement of the foot may not be possible, or at least makes holding the item particularly difficult. In contrast, due to the assistance device, this movement and/or placement of the foot are/is no longer necessary.

In another advantageous embodiment of the assistance device, the detection device is configured as a mobile detection device. The item may thus be detected largely independently of a position of the motor vehicle. For example, the item may already be detected in a building by means of the mobile detection device. This detection may be transmitted wirelessly, for example, to the motor vehicle or the door opening device. A person may subsequently load the item completely into the cargo area of the motor vehicle without first having to set the item down. The access opening for the loading is already released due to the detection.

The mobile detection device may be configured as a mobile telephone, for example. A mobile telephone may also be referred to as a cell phone. The detection may then take place, for example, by means of a camera of the mobile telephone. Alternatively or additionally, the mobile detection device may be configured as a barcode scanner or may include a barcode scanner. The item may then be detected by scanning in a barcode, the barcode being compared to a database. This database may be stored in the motor vehicle or in the mobile detection device, or also on the Internet or in some other external database, for example. The detection device may also include an input device that allows manual detection of the item.

The detection device may also be configured as a 3D camera and/or 3D scanner, for example. The 3D camera and/or the 3D scanner may also have a portable configuration.

Alternatively or additionally, a sensor of the detection device may be situated on the motor vehicle. For example, a camera of the detection device, as a sensor on the motor vehicle, may detect a person approaching the vehicle and identify an item. The access opening to the cargo area of the motor vehicle may then likewise be released in accordance with this identification. By means of image recognition software, persons for whom a particular access permission to the cargo area is stored in the assistance device may also be identified. The at least one access opening is then released only for persons who are authorized for access.

In another advantageous embodiment of the assistance device, a dimension of the item and/or a weight of the item are/is detectable by means of the detection device, wherein, in accordance with the detected dimension and/or the detected weight, the at least one access opening of the cargo area is selectable, from a plurality of access openings of the motor vehicle, for release by means of a selection device of the assistance device. In this selection, consideration may be made, for example, for whether the item will even fit through a certain access opening. Consideration may likewise be made for which access opening the item, based on its dimensions, may be best loaded through.

The weight of the item may likewise be taken into account in selecting the access opening. For example, it is more difficult to load a particularly heavy item into the cargo area through a particularly high access opening. For particularly heavy items, for this reason a particularly low access opening may be selected.

In the selection, it may likewise be taken into account that some of the access openings may be blocked by the surroundings of the motor vehicle. The size of the item may hereby also be taken into account. The surroundings of the motor vehicle may be detected by an additional sensor in the detection device. However, this sensor may also be the same sensor with which the item is detected. One example of such is once again the 3D camera.

In another advantageous embodiment of the assistance device, a loading location for the item is determinable by means of an evaluation device of the assistance device in accordance with the detected dimension and/or the detected weight of the item, and the at least one access opening is selectable from the plurality of access openings of the motor vehicle for release in accordance with this determined loading location, by means of the selection device. The evaluation device may be part of the selection device or may also correspond to the selection device. Thus, for example, the closest access opening to the intended loading location may be selected for release. Overall, the access opening via which the loading of the motor vehicle with the item is particularly easy may thus be selected.

The loading location may be displayed in the cargo area by means of a display device, for example. For this purpose, for example, particular light sources may be situated in a floor of the cargo area. Alternatively or additionally, for example, a type of projector may display the intended loading location in the cargo area. Alternatively or additionally, the loading location may be displayed on a display, for example, this display preferably being situated on the mobile detection device. The planned loading location may already be displayed to a user during the detection of the item. In this case, a manual modification of the planned loading location is also easily possible.

Due to releasing a certain access opening, the particular access opening for which the item is easiest to load into the motor vehicle is intuitively indicated to the person who is loading the item into the motor vehicle. At the same time, the person is thus also signaled, at least in part, as to where in the motor vehicle the item may best be stowed.

In another advantageous embodiment of the assistance device, by means of the assistance device, in accordance with the detection of the item, the detected dimension of the item, the detected weight of the item, and/or the determined loading location, at least one movable element of the cargo area, in particular a seat, a sliding roof, a head restraint, and/or a roller blind, is automatically adjustable by means of an adjustment device for preparation for the loading of the cargo area with an item. The movable element of the cargo area is thus a type of cargo area feature and/or vehicle interior feature. Thus, prior to loading, the cargo area may already be automatically adjusted to the item for particularly advantageous stowing. Of course, multiple movable elements may also be adjusted by means of the adjustment device; for example, the head restraints for all rear seats are initially retracted, and the rear seats themselves are then folded down. The adjustment device may include multiple actuators for this purpose.

In another advantageous embodiment of the assistance device, the assistance device includes a sensor device by means of which it is detectable whether the item has been removed from the cargo area of the motor vehicle, and in accordance with this detection, the movable element of the cargo area is automatically adjustable into a starting position by means of the adjustment device. For example, if particular seat backs in an interior of the motor vehicle have been automatically folded forward for loading with an item, the seat backs are also automatically folded back after the item is removed. Thus, for example, for a motor vehicle whose interior has been optimized for transporting an item by means of the adjustment device, after this transport is completed, it is no longer necessary to manually restore a state that is optimized for transporting persons.

In another advantageous embodiment of the assistance device, the assistance device includes a sensor device for detecting a distance of the item from the motor vehicle, wherein in accordance with this detection, the at least one access opening to the cargo area of the motor vehicle is releasable by means of the door opening device of the motor vehicle. In particular, the access opening is not released until the distance of the item from the motor vehicle has dropped below a minimum distance. This prevents the cargo area or the access opening from being released when a person who is authorized for access to the motor vehicle is not yet in visual range. Unauthorized persons may thus be prevented from gaining access to the cargo area of the motor vehicle. In addition, the cargo area is thus protected for a particularly long time from environmental influences, such as rain, due to the access openings still being closed. It is thus possible for the access opening to be released only just before a person with the item arrives at the motor vehicle.

In another advantageous embodiment of the assistance device, the assistance device includes a sensor device by means of which it is detectable whether loading of the motor vehicle with the item is completed, wherein in accordance with this detection, the at least one access opening to the cargo area of the motor vehicle is closable by means of the door opening device of the motor vehicle. This sensor device may be configured, for example, as a photoelectric barrier in the access opening. Alternatively, for example a camera by means of which the item is detected may also be utilized. It is preferably detected that the item as well as a person who is loading the item into the motor vehicle are no longer present in the access opening. The access opening thus no longer has to be manually closed. Instead, the access opening is automatically reclosed after the loading is completed, as a result of which the loading may be concluded in a particularly convenient manner.

A second aspect of this disclosure relates to a method for operating an assistance device for loading a motor vehicle. The assistance device includes at least one detection device by means of which an item to be loaded into the motor vehicle is detected, and at least one door opening device by means of which at least one access opening to a cargo area of the motor vehicle is released in accordance with this detection of the item.

The assistance device according to the first aspect of this disclosure may be operated by means of the method according to the second aspect of the invention. The features and advantages that result from use of the assistance device according to the first aspect of this disclosure are apparent from the descriptions of the first aspect of this disclosure, wherein advantageous embodiments of the first aspect of this disclosure are to be regarded as advantageous embodiments of the second aspect of this disclosure, and vice versa.

Further advantages, features, and particulars of this disclosure result from the following description of a preferred exemplary embodiment and with reference to the drawing. The features and feature combinations mentioned above in the description as well as the features and feature combinations mentioned below in the description of the FIGURES and/or only shown in the FIGURES may be used not only in the particular stated combination, but also in other combinations or alone without departing from the scope of this disclosure.

FIG. 1 shows a schematic side view of a motor vehicle with an assistance device for loading this motor vehicle.

FIG. 1 shows a schematic side view of a motor vehicle 10, having a cargo area 12 into which an item 14 is to be loaded. The cargo area 12 corresponds, for example, to the interior of the motor vehicle 10. Alternatively, the cargo area 12 may be a space in a trunk of the motor vehicle 10, or, for example, a particular cargo area in an underbody of a touring bus.

As is apparent in FIG. 1, the item 14 is carried by a person 16 with both hands. That is, to be able to load the item 14 into the cargo area 12, the person 16 would have to release an access opening 18 to the cargo area 12 by initially setting the item 14 down, and then, for example, manually opening a side door 20 of the motor vehicle 10. Such loading of the motor vehicle 10 is slow and cumbersome. In addition, the item 14 may be soiled by being set down. However, for this reason the motor vehicle 10 has an assistance device 22 for loading the motor vehicle 10 with the item 14. This assistance device 22 includes a detection device 24 by means of which the item 14 to be loaded into the motor vehicle 10 is detectable. In addition, the assistance device 22 includes a door opening device 26 by means of which, in accordance with the detection of the item 14, at least one access opening 18 to the cargo area 12 of the motor vehicle 10 is releasable. In the example shown, for example the side door 20 is automatically opened for loading with the item 14.

As a result, the person 16 no longer has to set the item 14 down for the loading into the motor vehicle 10. Instead, an access opening 18 to the motor vehicle 10 or the cargo area 12 is automatically released.

The detection device 24 may include a camera, for example. The item 14 itself as well as its dimensions may be detected by means of this camera. The detection device 24 may also be configured for detecting a weight of the item 14. In accordance with the detected dimensions and/or the detected weight of the item 14, by means of a selection device 28 of the assistance device 22, it may be determined which of a plurality of access openings 18 of the motor vehicle 10 is best suited for loading with the item 14. For example, the item 14 could have a dimension that allows loading into the motor vehicle 10 through the side door 20, but not via the trunk lid 30. In addition, by detecting the dimensions of the item 14 by means of an evaluation device 34, it may also be determined where the item 14 is most favorably stowed in the cargo area 12. Also in accordance with this planned stowing location, the access opening 18 may be selected by means of the selection device 28.

This determined loading location within the cargo area 12 may, for example, be displayed to the person 16 visually, for example, by means of particular lights in the cargo area 12. In addition, due to the access opening 18 that is released for the loading, the person 16 already receives an indication of where the item 14 is most favorably stowable in the cargo area 12.

In addition, the assistance device 22 may also include an adjustment device 32 by means of which particular adjustable elements in the cargo area 12 may be adjusted to the item 14 in accordance with the detection of the item 14. For example, particular rear seat backs of seats in the interior of the motor vehicle 10 may be automatically folded down for stowing the item 14.

After the item 14 is unloaded from the cargo area 12, particular adjustable elements may be automatically moved back into a starting position by means of the adjustment device 32. This starting position may, for example, be a position that the movable elements have assumed prior to their automatic adjustment for accommodating the item 14. As a result, these adjustable elements no longer have to be manually moved back into a starting position. Thus, for example, after the transporting of the item 14 is completed, the motor vehicle 10 is automatically reconfigured for particularly comfortable accommodation of passengers.

The detection device 24 may also be configured for detecting whether the loading of the item 14 into the cargo area 12 is completed. For this purpose, in particular it may be detected whether the access opening 18 is once again released by the item 14 and/or the person 16, and/or whether the item 14 has been loaded into the cargo area 12, in particular at a loading location determined beforehand by means of the evaluation device 34. Particular closing elements of the access opening 18 may then be automatically reclosed. Thus, in the example shown in FIG. 1, for example, the side door 20 is reclosed after the item 14 has been completely stowed in the cargo area 12. For this reason as well, the item 14 is particularly convenient and easy to stow.

The detection device 24 may also include a mobile terminal 36. In the example shown, this mobile terminal 36 is worn on the belt of the person 16. This may be a mobile telephone, for example. The item 14 may likewise be detected by means of this mobile telephone. For example, the mobile telephone may include a 3D camera by means of which particular dimensions of the item 14 are already detected in a building before the person 16 picks up the item 14 for loading. Alternatively or additionally, for example, a barcode of the item 14 may be read by means of the mobile terminal 36. The item 14 may thus be detected by retrieving particular information, for example, dimensions and weight, from a database, based on the detected barcode. This information is then available to the assistance device 22 for automatically releasing the access opening 18, for selecting an optimal loading location, and/or for adjusting the movable elements in the cargo area 12. The information retrieved from the database may be particularly precise.

The detection device 24 may, for example, also include a 3D camera, as a sensor, that is situated on the motor vehicle 10. This 3D camera is also suitable for detecting the dimensions of the item 14 and/or detecting whether the item 14 has been completely loaded into the cargo area 12.

A distance of item 14 from the motor vehicle 10 may also be determined by means of the detection device 24. For this purpose, for example, the item 14 and/or the person 16 are/is once again detected by means of the 3D camera and a distance from the motor vehicle 10 is computed. Alternatively, for example, a distance of the mobile terminal 36 and/or a car key of the motor vehicle 10 may be detected. The car key is not shown in FIG. 1. For example, the car key may carried by the person 16 in his/her pants pocket. For this purpose, for example the mobile terminal 36 and/or the car key may transmit a radio signal to the motor vehicle 10 or to the detection device 24. The access opening 18 is then released in accordance with this detected distance. In particular, it is possible for the access opening 18 to not be released until the distance of the item 14 from the motor vehicle 10 has dropped below a minimum distance. This avoids the situation that the access opening 18 to the cargo area 12 is released before the person 16 can monitor this access opening 18. The cargo area 12 may thus be protected from unauthorized access by third parties. It may also be provided that an authorization for access to the cargo area 12 is automatically checked by means of the mobile terminal 36 and/or the car key. For this purpose, for example, an identification number may be transmitted from the mobile terminal 36 to the detection device 24 or the motor vehicle 10 and/or the assistance device 22.

In addition, it may be detected by means of the detection device 24 whether particular access openings 18 of the motor vehicle 10 or of the cargo area 12 are blocked by the surroundings of the motor vehicle 10, at least for the loading with the item 14. This detection may also be taken into account during the release and/or the selection of the access opening 18 for the loading.

Due to design and feature requirements, vehicles of all types have stowage options that have different designs and that are sometimes distributed very differently in the vehicle and that, due to optional features, sometimes for the very same model, may have cargo areas 12 with very different configurations. Depending on the vehicle and the item 14 to be transported, correct stowage is therefore a challenge.

By means of the assistance device 22, the motor vehicle 10 automatically makes preparations in such a way that a person 16 packing the item 14 only has to place the item 14 to be transported into the cargo area 12. The assistance device 22 may also provide the person 16 packing the item 14 with additional information concerning a sequence of multiple items 14 to be loaded. Particular movable elements such as seats, sliding roofs, head restraints, roller blinds, and/or nets are already adjusted by means of the adjustment device 32 into a position that particularly simplifies the loading. In addition to such preparation inside the vehicle, particular access openings 18 may also already be opened for the loading, as needed. Thus, it is no longer necessary to carry out further opening procedures such as actuating a door handle and/or a foot sensor beneath a bumper. The assistance device 22 automatically responds when the motor vehicle 10 is approached. Rapid, efficient loading without the need to set down bulky items is thus possible. The motor vehicle 10 no longer has to be manually prepared for transport, and no laborious procedures for opening particular doors and trunk lids are necessary. The fastest possible stowage is possible in the event of bad weather, darkness, hazardous situations, and also for heavy items. The particular stowage position of items may be optimized in such a way that the cargo area 12 may accommodate a particularly large number of items.

The invention claimed is:

1. An assistance device for loading a motor vehicle, comprising:
   at least one detection device configured to detect an item to be loaded into the motor vehicle and identify the item as a detected item;
   a selection device configured to select at least one access opening from a plurality of access openings to a cargo area of the motor vehicle based on a weight of the detected item;
   a door opening device configured to release the at least one access opening to the cargo area of the motor vehicle for loading the detected item; and
   a first sensor device configured to detect a completed loading of the motor vehicle with the detected item,
   wherein the at least one detection device is further configured to detect the weight of the detected item, and
   wherein the door opening device is further configured to close the at least one access opening to the cargo area of the motor vehicle upon the completed loading of the detected item.

2. The assistance device of claim 1, wherein the at least one detection device is configured as a mobile detection device, and wherein the mobile detection device is separate from the motor vehicle.

3. The assistance device of claim 1, further comprising a third sensor device configured to:
   detect a distance of the detected item from the motor vehicle,
   wherein the door opening device is further configured to release the at least one access opening to the cargo area of the motor vehicle based on the distance of the detected item from the motor vehicle.

4. The assistance device of claim 1, further comprising an evaluation device configured to:
   determine a loading location for the detected item based on a dimension of the detected item or the weight of the detected item,
   wherein the selection device is further configured to select the at least one access opening from the plurality of access openings to the cargo area of the motor vehicle based on the loading location.

5. The assistance device of claim 4, further comprising an adjustment device configured to:
   adjust at least one movable element of the cargo area of the motor vehicle in preparation for loading the cargo area with the detected item based on the dimension of the detected item, the weight of the detected item, or the loading location.

6. The assistance device of claim 5, further comprising a second sensor device configured to:
   detect a removal of the detected item from the cargo area of the motor vehicle,
   wherein the adjustment device is further configured to adjust the at least one movable element of the cargo area of the motor vehicle to a starting position in response to the removal of the detected item.

7. A method for operating an assistance device for loading a motor vehicle, comprising:
   detecting, by at least one detection device of the assistance device, an item to be loaded into the motor vehicle;
   identifying, by the at least one detection device of the assistance device, the item to be loaded into the motor vehicle as a detected item;
   detecting, by the at least one detection device of the assistance device, a weight of the detected item;
   selecting, by a selection device of the assistance device, at least one access opening from a plurality of access openings to a cargo area of the motor vehicle based on the weight of the detected item;

releasing, by a door opening device of the assistance device, the at least one access opening to the cargo area of the motor vehicle for loading the detected item;

detecting, by a first sensor device of the assistance device, a completed loading of the motor vehicle with the detected item; and closing, by the door opening device of the assistance device, the at least one access opening to the cargo area of the motor vehicle upon the completed loading of the detected item.

8. The method of claim 7, wherein the at least one detection device is configured as a mobile detection device, and wherein the mobile detection device is separate from the motor vehicle.

9. The method of claim 7, further comprising:

detecting, by a third sensor device of the assistance device, a distance of the detected item from the motor vehicle, wherein the releasing by the door opening device includes releasing the at least one access opening to the cargo area of the motor vehicle based on the distance of the detected item from the motor vehicle.

10. The method of claim 7, further comprising:

determining, by an evaluation device of the assistance device, a loading location for the detected item based on a dimension of the detected item or the weight of the detected item; and selecting, by the evaluation device of the assistance device, the at least one access opening from the plurality of access openings to the cargo area of the motor vehicle based on the loading location.

11. The method of claim 10, further comprising:

adjusting, by an adjustment device of the assistance device, at least one movable element of the cargo area of the motor vehicle in preparation for loading the cargo area with the detected item based on the dimension of the detected item, the weight of the detected item, or the loading location.

12. The method of claim 11, further comprising:

detecting, by a second sensor device of the assistance device, a removal of the detected item from the cargo area of the motor vehicle, wherein the adjusting by the adjustment device further includes adjusting the at least one movable element of the cargo area of the motor vehicle to a starting position in response to the removal of the detected item.

\* \* \* \* \*